United States Patent [19]

Koike

[11] Patent Number: 4,651,296

[45] Date of Patent: Mar. 17, 1987

[54] HIGH SPEED CMOS FET FULL-ADDER CIRCUIT

[75] Inventor: Hideharu Koike, Yokohama, Japan

[73] Assignee: Kabushiki Kaisha Toshiba, Kawasaki, Japan

[21] Appl. No.: 609,114

[22] Filed: May 11, 1984

[30] Foreign Application Priority Data

May 16, 1983 [JP] Japan .................................. 58-85243

[51] Int. Cl.$^4$ ............................................. G06F 7/50
[52] U.S. Cl. .................................... 364/784; 364/786
[58] Field of Search ....................... 364/784, 785, 786

[56] References Cited

U.S. PATENT DOCUMENTS

| 4,417,314 | 11/1983 | Best ..................................... | 364/785 |
| 4,471,454 | 9/1984 | Dearden et al. .................... | 364/786 |
| 4,541,067 | 9/1985 | Whitaker ............................ | 364/784 |
| 4,564,921 | 1/1986 | Suganuma ........................... | 364/784 |

OTHER PUBLICATIONS

Fukuma et al., "SOS CMOS 16 Bit Parallel Multiplier," 13th Conference on Solid State Devices, Tokyo 1981, pp. 15-16.

*Primary Examiner*—David H. Malzahn
*Attorney, Agent, or Firm*—Finnegan, Henderson, Farabow, Garrett & Dunner

[57] ABSTRACT

A full-adder circuit comprising a first node for providing an inverted summed output, a second node for providing an inverted carry output, a plurality of P channel MOS FETs connected between a Vcc terminal and the first and second nodes to form a first circuit pattern, the P channel MOS FETs being applied at the gates with an addend input signal of N-bits (N is a natural number of 1 or more) and an augend input signal of N-bits, a carry input signal of one-bit, and the one-bit inverted signals of the input signals, a plurality of N channel type MOS FETs connected between a Vss terminal and the first and second nodes to form a second circuit pattern which is substantially the same as that of said first circuit pattern, said N channel type MOS FETs being applied at the gates with the same addend, augend and carry inputs as those applied to the P channel type MOS FETs in a similar manner, a first inverter connected between the first node and a summed output terminal and for inverting a signal at the first node, and a second inverter connected between the second node and a carry output terminal and for inverting a signal at the second node.

4 Claims, 5 Drawing Figures

HIGH SPEED CMOS FET FULL-ADDER CIRCUIT

BACKGROUND OF THE INVENTION

The present invention relates to a full-adder circuit fabricated into a semiconductor integrated circuit, and more particularly to a full-adder circuit structured with CMOS FETs (complementary metal oxide field effect transistors).

A one-bit full-adder circuit of the CMOS FET type as prior art will be discussed referring to FIG. 1. In the figure, the full-adder circuit is comprised of a summing section for producing a summed output S, which includes a first exclusive OR circuit 1 and a second exclusive OR circuit 2, and a carry section 3 for producing a carry output Co as the result of an overflow. In the summing section, the first exclusive OR circuit 1 has two inputs, an addend input A, and an augend input B. The second exclusive OR circuit 2 also has two inputs, the output of the first exclusive OR circuit 1, and a carry input Ci. Structurally, the first exclusive OR circuit 1 is made up of a plurality of N channel MOS FETs, a plurality of P channel MOS FETs, and two MOS inverters I1 and I2. Similarly, the second exclusive OR circuit 2 is made up of a plurality of N channel MOS FETs, a plurality of P channel MOS FETs, and two MOS inverters I3 and I4. The carry section 3 is made up of a plurality of N channel MOS FETs, a plurality of P channel MOS FETs, and an inverter I5.

In the prior art full-adder circuit, the summing section uses as many as five stages of gates in the route, ranging from an input port for the augend B to an output port for the summed output S. During the adding operation, these gate stages respectively perform charging and discharging operations. Therefore, the use of many gates deteriorates the operation speed. The summing section and the carry section are entirely different from each other in the circuit arrangement. This fact suggests that two entirely different circuit patterns should be designed for these circuits in using integrated circuit technology, which requires a large pattern area. Further, five stages of gates are used in the summing section, but only two stages of the gates are used for the carry section. With the difference in number of the gate stages between those circuit sections, the summed output S and the carry output Co are produced at different timings. This timing difference creates other problems. For example, in designing a parallel multiplier, it is difficult to speed up the operation speed when it uses such a full-adder circuit. The different timing problems of the prior art full-adder circuit limit the applications of the full-adder circuit.

SUMMARY OF THE INVENTION

Accordingly, an object of the present invention is to provide a full-adder circuit based on CMOS FETs which is satisfactory in operating speed performance and with high integration density.

According to the invention, there is provided a full-adder circuit comprising a power potential terminal, a reference potential terminal, at least one summed output terminal, a carry output terminal, at least one first node for providing at least one inverted summed output, a second node for providing an inverted carry output, a plurality of first channel MOS FETs connected between said power potential terminal and said first and second nodes to form a first circuit of a first pattern, said first MOS FETs being applied at the gates with an addend input signal of N-bits (N is a natural number of 1 or more) and an augend input signal of N-bits, a carry input signal of one-bit, and the one-bit inverted signals of said respective input signals, a plurality of second channel type MOS FETs connected between said reference potential terminal and said first and second nodes to form a second circuit of a second pattern which is substantially the same as that of said first circuit pattern, said second channel type MOS FETs being applied at the gates with the same inputs as those applied to said first channel type MOS FETs in a similar manner, a first inverter connected between said first nodes and said summed output terminals and for inverting the signal at said first node, and a second inverter connected between said second node and said carry output terminal and for inverting the signal at said second node.

DETAILED DESCRIPTION OF THE PREFERRED EMBODIMENTS

Before entering the description of preferred embodiments of the present invention, some notations and symbols employed in this specification for simplicity of illustration and explanation will be given.

Figure 3:
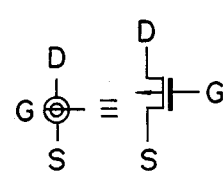
FIGS. 3 and 4, respectively, illustrate symbols employed in this specification and corresponding standard symbols for representing P channel and N channel MOS transistors.
Figure 4:
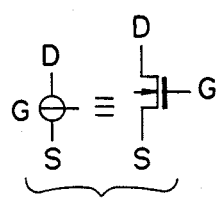

The symbol shown on the left side in FIG. 3 stands for a P channel enhancement mode MOS FET of which the standard symbol is shown on the right side. Similarly, the symbol on the left side in FIG. 4 stands for an N channel enhancement mode MOS FET which is normally represented by a symbol on the right side. Some notations are: Vcc stands for a positive power potential, Vss for ground potential, A for addend input, $\bar{A}$ for the inverted addend input, B for augend, $\bar{B}$ for the inverted augend, Ci for carry input, and $\bar{C}i$ for the inverted carry input.

Figure 2:
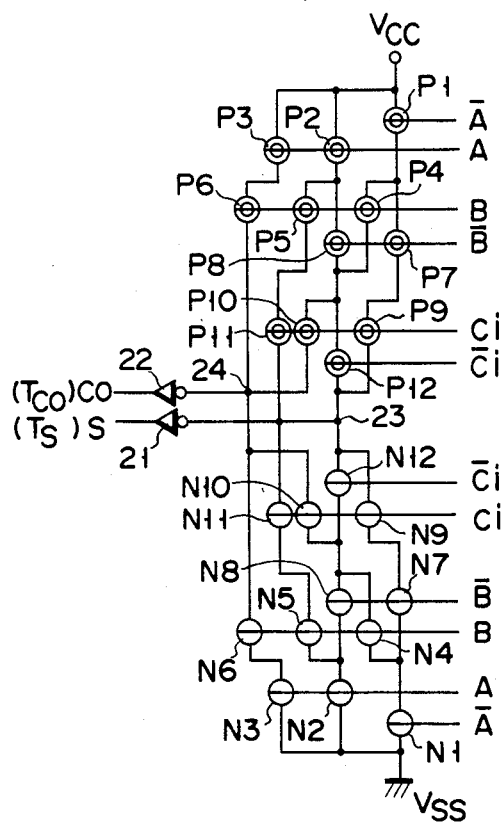
FIG. 2 is a circuit diagram of an embodiment of a full-adder circuit according to the present invention.

Reference is made to FIG. 2 illustrating a full-adder circuit according to the present invention which is designed to be able to handle a one-bit input signal. As shown, the full-adder circuit contains a couple of symmetrical circuit sections. One is comprised of P channel MOS FETs P1–P12 and is illustrated with the upper half in the drawing. The other is made up of N channel MOS FETs N1–N12 in the lower half. The upper half circuit section has three pairs of inputs, a first pair of addend input A and the inverted addend input $\bar{A}$, a second pair of augend input B and the inverted augend input $\bar{B}$, and a third pair of carry input Ci and the inverted carry input $\bar{C}i$. The addend input A, augend input B and carry input Ci are each of one-bit. The lower half circuit section also has three pairs of the same inputs as those of the upper half circuit section. Both the circuit sections are connected together to a summed output S via a node 23 and an inverter 21, and further to a carry output Co via a node 24 and an inverter 22, as shown.

A circuit arrangement of the upper half circuit section will first be given in detail. The addend input $\overline{A}$ is applied to the gate of the MOS FET P1. The addend input A is applied to the gates of the MOS FETs P2 and P3. The augend input B is applied to the gates of the MOS FETs P4–P6. The inverted augend input $\overline{B}$ is applied to the gates of the MOS FETs P7 and P8. The carry input Ci is applied to the gates of the MOS FETs P9–P11. The carry input $\overline{Ci}$ is applied to the gate of the MOS FET P12. The MOS FETs P1, P7, and P9 are connected in series between a positive power potential Vcc and the input terminal (node 23) of the inverter 21 for providing a summed output S. The MOS FETs P2, P5, and P11 are connected in series between the positive power potential Vcc and the node 23. The MOS FETs P8 and P12 are connected in series between the interjunction of the MOS FETs P2 and P5 and the node 23. The MOS FET P4 is inserted between the interjunction of the MOS FETs P1 and P7 and the interjunction of the MOS FETs P8 and P12. The MOS FETs P3 and P6 are connected in series between the positive power potential Vcc and the input terminal (node 24) of the inverter 22 for providing a carry output Co. The MOS FET P10 is connected between the interjunction of the MOS FETs P8 and P12 and the node 24.

A circuit arrangement of the lower half circuit section, which is substantially the same as that of the upper circuit section, will next be given in detail. The addend input $\overline{A}$ is applied to the gate of the MOS FET N1. The addend input A is applied to the gates of the MOS FETs N2 and N3. The augend input B is applied to the gates of the MOS FETs N4–N6. The inverted augend input $\overline{B}$ is applied to the gates of the MOS FETs N7 and N8. The carry input Ci is applied to the gates of the MOS FETs N9–N11. The carry input $\overline{Ci}$ is applied to the gate of the MOS FET N12. The MOS FETs N1, N7 and N9 are connected in series between ground potential Vss and the input terminal (node 23) of the inverter 21 for providing a summed output S. The MOS FETs N2, N5, and N11 are connected in series between the ground potential Vss and the node 23. The MOS FETs N8 and N12 are connected in series between the interjunction of the MOS FETs N2 and N5 and the node 23. The MOS FET N4 is inserted between the interjunction of the MOS FETs N1 and N7 and the interjunction of the MOS FETs N8 and N12. The MOS FETs N3 and N6 are connected in series between the ground potential Vss and the input terminal (node 24) of the inverter 22 for providing a carry output Co. The MOS FET N10 is connected between the interjunction of the MOS FETs N8 and N12 and the node 24.

In the full-adder circuit thus arranged, a path between the node 23 and the ground potential Vss is conductive when the inputs (A, B, Ci) is (1, 0, 0), (0, 1, 0), (0, 0, 1) or (1, 1, 1). This condition for the conduction of the path is that an odd number of inputs A, B and Ci have a logical value of 1 which is expressed by $$A+B+Ci=1 \text{ or } 3 \quad (1)$$

A path between the node 23 and the positive power potential Vcc is conductive when the inputs (A, B, Ci) are (1, 1, 0), (1, 0, 1), (0, 1, 1), or (0, 0, 0). This condition is that zero inputs or an even number of inputs A, B and Ci have a logical value of 1 which is expressed by $$A+B+Ci=0 \text{ or } 2 \quad (2)$$

A path between the node 24 and the ground potential Vss is conductive when $2^N$ or more of the inputs A, B and Ci is logical 1. Here, N indicates the number of addition bits and is 1, N=1 in this embodiment. This condition is expressed $$A+B+Ci \geq 2 \quad (3)$$

A path between the node 24 and the positive power potential Vcc is conductive when one of the inputs A, B and Ci is logical 1 or all of these inputs are logical 0. This condition is given $$A+B+Ci \leq 1 \quad (4)$$

Consequently, the summed output S and the carry output Co are expressed by the logical formulae.

The relation (1), $A+B+Ci=1$ or 3, must be satisfied in order that the node 23 is set at logical 0. In other words, logical 0 appears when the relation (2), $A+B+Ci=0$ or 2, is not satisfied. The logical level at the node 23 is inverted by the inverter 21. Therefore, the summed output S is given $$S = A \oplus B \oplus Ci \quad (5)$$

In the above relation, $\oplus$ represents an exclusive OR.

For setting the logical level of the node 24 to be logical 0, the equation (3), $A+B+Ci \geq 2$, must be satisfied. In other words, logical 0 appears at the node 24 when the relation (4), $A+B+Ci \leq 1$ is not satisfied. The logic level at the node 24 is inverted by the inverter 22. Therefore, the carry output Co is $$Co = A \cdot B + (A+B) \cdot Ci \quad (6)$$

In the above, + indicates OR and a dot · represents AND.

As seen from the foregoing description, the full-adder circuit of this embodiment can produce a summed output S and a carry output Co which are given by the logical relations (5) and (6), respectively.

Figure 1:
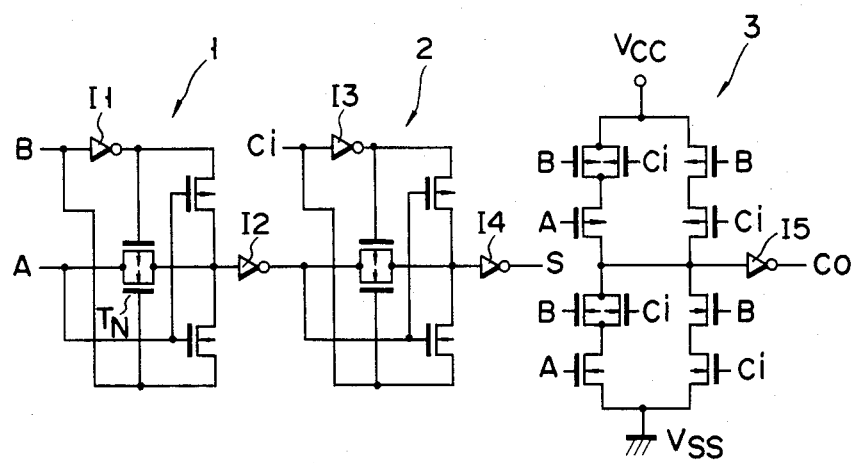
FIG. 1 is a circuit diagram of a full-adder circuit of the prior art.

This embodiment requires a smaller number of gate stages than the prior art circuit shown in FIG. 1. Therefore, the number of charging and discharging operations is lessened, and hence the operation speed is improved. It is noted that the upper-half circuit section made up of P channel MOS FETs P1–P12 and the lower-half circuit section containing the N channel MOS FETs N1–N12 are substantially the same in pattern. This fact is very useful in fabricating the full-adder circuit into an integrated circuit. Further, the chip area necessary for the circuit pattern is reduced.

It is further noted that some of the MOS FETs in the group P1–P12, the MOS FET P1, for example, lie in both of the paths between the positive power potential Vcc and the node 23, and between the positive power potential Vcc and the node 24. Similarly, some of the MOS FETs in the group N1–N12, the MOS FET N1, for example, lie in both of the paths between the ground potential Vss and the node 23, and between the ground potential Vss and the node 24. Similarly, some of those transistors are commonly used for both the sum output path and the carry output path. Therefore the circuit arrangement is simplified. Additionally, the number of gate stages present between each signal input and the summed output is equal to that between each signal input and the carry output. This indicates that both the summed output S and the carry output Co are generated at substantially the same time. This fact allows the full-adder circuit to have a wide range of application.

Also to be noted is the particular location of the inputs for addition and carrying in the circuit array. The addend input A, the addend input $\overline{A}$, the augend input B, and the inverted augend input $\overline{B}$ are applied to the P channel MOS FETs P1-P8 closest to the positive power potential Vcc, and to the N channel MOS FETs N1-N8 closest to the ground potential Vss. The carry input Ci and the carry input $\overline{Ci}$ are applied to the P channel MOS FETs P9-P12 and to the N channel MOS FETs N9-N12 which are closest to the nodes 23 and 24. Of course, if necessary, the input pairs A and $\overline{A}$, and B and $\overline{B}$ may be replaced with each other. Further, the carry input Ci and $\overline{Ci}$ may be replaced with the input pair A and $\overline{A}$, or with the input pair B and $\overline{B}$. In the adder, however, the addition inputs A and $\overline{A}$, and B and $\overline{B}$ are usually processed earlier than the carry inputs Ci and $\overline{Ci}$. Therefore, it is preferable to employ the arrangement used in the above embodiment from an operation speed standpoint.

Figure 5:
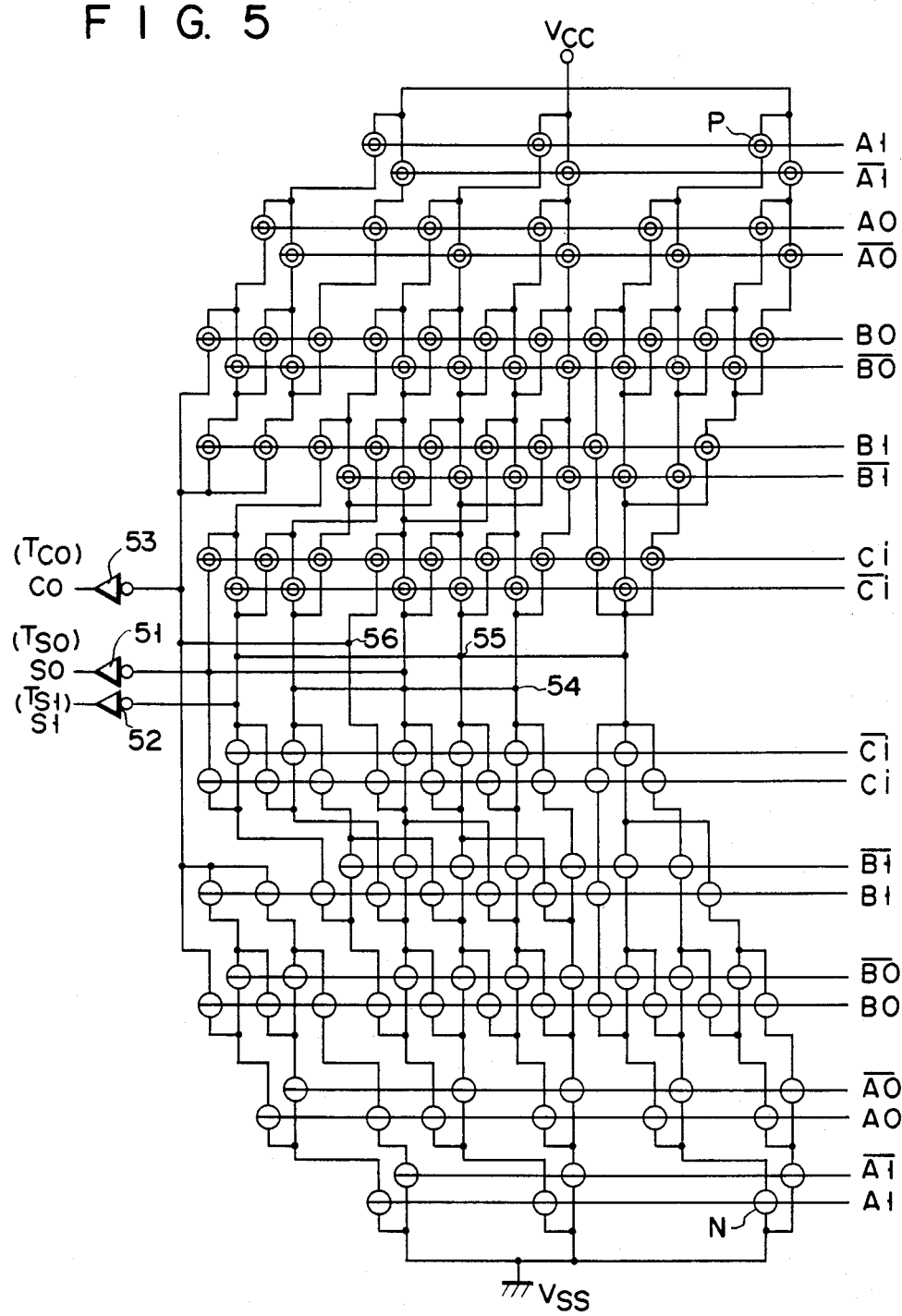
FIG. 5 is a circuit diagram of another embodiment of a full-adder circuit according to the present invention.

Referring now to FIG. 5, there is shown another embodiment of a full-adder circuit according to the present invention which is designed to be able to handle a two-bit signal.

The addend input consists of two-bits, the upper order bit A1 and the lower order bit A0. The augend consists of two-bits, the upper order bit B1 and the lower order bit B0. Those bits are associated with the inverted A, $\overline{A}$, B and $\overline{B}$, respectively. A pair of the carry input Ci and the inverted carry input $\overline{Ci}$ are also employed. Sixty-eight (68) P channel MOS FETs P1-P68 are arranged in a predetermined pattern between the positive power potential Vcc and the nodes 54-56, as shown. In a similar pattern, sixty-eight (68) N channel MOS FETs N1-N68 are arranged between the ground potential Vss and the same nodes 54-56. The addition inputs A0, $\overline{A0}$, A1, $\overline{A1}$, B0, $\overline{B0}$, B1, $\overline{B1}$, Ci and $\overline{Ci}$ are applied to the gates of the transistors N1-N68, and to P1-P68, respectively.

The node 54 is connected to an inverter 51 of which the output Tso serves as a first output terminal providing a first summed output S0. The node 55 is connected to an inverter 52 of which the output Ts1 serves as a second output terminal Ts1 providing a second summed output S1. The node 56 is connected to an inverter 53 of which the output Tco serves as a carry output terminal Tco providing a carry output Co.

In the FIG. 5 embodiment, in order that the node 54 (input terminal of the inverter 51) takes the ground potential Vss, the total sum $\Sigma(=A+B+C)$ of the inputs A, B and Ci must be an odd number (1, 3, 5, 7 in this embodiment). On the other hand, in order that the node 54 has a logical value of 1, the total sum $\Sigma$ must be an even number (0, 2, 4, 6). The logical level at the node 54 is inverted by the inverter 51. Therefore, the output terminal of the inverter 51, i.e., the first summed output terminal Tso, has the lower order bit So of the summed output S. The input terminal of the inverter 52, i.e., the node 55, is logical 0 when the total sum $\Sigma$ must be 2, 3, 6 or 7. It is logical 1 when the total sum $\Sigma$ is 0, 1, 4 or 5. In this way, the second total output terminal Ts1 provides the upper order bit S1 of the summed output S. Further, the input terminal of the inverter 53, i.e., the node 56, is logical 0 when the total sum $\Sigma$ is $2^N$ (N is the number of the addition bits, 4, 5, 6 or 7 in this embodiment) or more. On the other hand, it is logical 1 when the total sum $\Sigma$ is 0, 1, 2, or 3. The inverter 53 inverts the logical level at the node 56. In this way, the carry output terminal Tco provides a carry output Co.

Through the above process, this embodiment produces a summed output S of two bits in length and outputs S0 and S1. This embodiment can also attain substantially the same useful effect as that shown in FIG. 2.

As seen from the foregoing description, the full-adder circuit according to the present invention requires a lesser number of charge/discharge operations during the computing operation. This feature improves operation speed. The first circuit section is constructed with P channel MOS FETs, and the second circuit section is constructed with N channel MOS FETs. Both sections are arranged in substantially the same patterns. In manufacturing the full-adder circuit, the patterning is less difficult and a high density of integration can be achieved. Furthermore, the summed output and the carry output are generated at the same time. This feature provides a wide application of the full-adder circuit.

What is claimed is:

1. A full-adder circuit comprising:
 a power potential terminal;
 a reference potential terminal;
 a plurality of summed output terminals;
 a carry output terminal;
 a plurality of first nodes for providing a plurality of inverted summed outputs;
 a second node for providing an inverted carry output;
 a plurality of first channel type MOS FETs, each having a gate, a drain and a source, connected between said power potential terminal and said plurality of first nodes and said second node to form a first circuit of a first pattern, said first channel type MOS FETs having an addend input signal of N-bits said N being a natural number of 1 or more, and an input signal of N-bits, a carry input signal of one-bit, and the inverted signals of said respective input signals applied at said gates;
 a plurality of second channel type MOS FETs, each having a gate, a drain and a source, connected between said reference potential terminal and said plurality of first nodes and said second node to form a second circuit of a second pattern having substantially the same pattern as said first circuit pattern, said second channel type MOS FETs having the inverted signals of said addend input signal, said augend input signal and said carry input signal applied to said gates;
 a first inverter connected between said plurality of first nodes and said plurality of summed output terminals for inverting the signal at said plurality of first nodes; and
 a second inverter connected between said second node and said carry output terminal for inverting the signal at said second node.

2. A full-adder circuit according to claim 1, in which said addend input signal is of one-bit, said augend input signal is of one-bit, said carry input signal is of one-bit, said plurality of first nodes includes a singles node, said power potential terminal includes a positive potential terminal, said plurality of first channel type MOS FETs are of P channel enhancement type, said plurality of second channel type MOS FETs are of N channel enhancement type, and said first and second circuits operate such that when one bit of said addend input signals, and said augend input signal and said carry input signal is logical "1", a path between an input terminal of said first inverter and said reference potential terminal is conductive while a path between the input terminal of said first inverter and said power potential terminal is nonconductive, and when or more bits of the combination of said addend input signal, said augend input signal and said carry input signal are logical "1", a path between an input terminal of said second inverter and said reference potential terminal is conductive while a path between the input terminal of said second inverter and said power potential terminal is nonconductive.

3. A full-adder circuit according to claim 1, in which said plurality of first nodes includes two nodes, said power potential terminal includes a positive potential terminal, said plurality of first channel type MOS FETs are of P channel enhancement type, said plurality of second channel type MOS FETs are of N channel enhancement type, and said first and second circuits operate such that when said addend input signal and said augend input signal each have a two-bit length and a total sum of the logical values of the bits of said addend input signal, augend input signal and said carry input signal is 1, 3, 5, or 7, one node of said plurality of first nodes is connected to said reference potential terminal, and when the total sum is 2, 3, 6, or 7, the other node of said plurality of first nodes is connected to said reference potential terminal.

4. A full-adder circuit according to claim 1, in which said addend input signal is of one-bit, said augend input signal is of one-bit, said carry input signal is of one-bit, said plurality of first nodes includes a single node, said power potential terminal includes a positive potential terminal, said plurality of first channel type MOS FETs are of P channel enhancement type, said plurality of second channel type MOS FETs are of N channel enhancement type, and said first and second circuits operate such that when three bits of said addend input signal, and said augend input signal and said carry input signal is logical "1", a path between an input terminal of said first inverter and said reference potential terminal is conductive while a path between the input terminal of said first inverter and said power potential terminal is nonconductive, and when two or more bits of the combination of said addend input signal and said augend input signal and said carry input signal are logical "1", a path between an input terminal of said second inverter and said reference potential terminal is conductive while a path between the input terminal of said second inverter and said power potential terminal is nonconductive.

* * * * *